United States Patent
Michel et al.

(10) Patent No.: US 6,207,335 B1
(45) Date of Patent: Mar. 27, 2001

(54) USE OF METAL CARBOXYLATES AND SULFONATES AS CHARGE CONTROL AGENTS

(75) Inventors: Eduard Michel, Frankfurt; Ruediger Baur, Eppstein; Hans-Tobias Macholdt, Darmstadt, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/376,029

(22) Filed: Aug. 17, 1999

(30) Foreign Application Priority Data

Aug. 19, 1998 (DE) .............................. 198 37 522

(51) Int. Cl.$^7$ .................................................. G03G 9/097
(52) U.S. Cl. ........................................... 430/110; 430/106
(58) Field of Search ..................... 430/106, 109, 430/110

(56) References Cited

U.S. PATENT DOCUMENTS

| | | | |
|---|---|---|---|
| 4,276,154 | 6/1981 | Singewald et al. | 209/3 |
| 4,367,275 | * 1/1983 | Aoki et al. | 430/110 |
| 4,403,027 | 9/1983 | Ishikawa et al. | 430/110 |
| 4,407,924 | 10/1983 | Senshu et al. | 430/109 |
| 5,294,682 | * 3/1994 | Fukuda et al. | 430/110 |
| 5,300,387 | * 4/1994 | Ong | 430/110 |
| 5,314,778 | * 5/1994 | Smith et al. | 430/111 |
| 5,346,793 | 9/1994 | Bertrand et al. | 430/110 |
| 5,378,571 | 1/1995 | Macholdt et al. | 430/110 |
| 5,484,678 | 1/1996 | Pickering et al. | 430/110 |
| 5,562,755 | 10/1996 | Fricke et al. | 95/58 |
| 5,571,654 | 11/1996 | Ong | 430/110 |
| 5,871,845 | 2/1999 | Dahringer et al. | 428/378 |

FOREIGN PATENT DOCUMENTS

| | | |
|---|---|---|
| 26 19 026 | 11/1977 | (DE) . |
| 4321289 | 1/1995 | (DE) . |
| 0 201 340 | 11/1986 | (EP) . |
| 0 623 941 | 3/1994 | (EP) . |
| 5-163449 | 6/1993 | (JP) . |
| WO 92/06414 | 4/1992 | (WO) . |

OTHER PUBLICATIONS

EPO Search Report.
European Patent Office Abstract of Japan 62163061.
Derwent Patent Family Report and/or Abstract.
"The Effect of an Externally Added Charge Control Agent on Contact Charging Between Polymers," Y. Higashiyama, G. Castle, I. Inculet, and J.D. Brown, Journal of Electrostatics, 30 (1993), pp. 203–212.
"Selektives Trennen von Salzmineralen aufgrund spezifischer Oberflächen–Eigenschaften," A. Singewald and L. Ernst, Zeitschrift Für Physikalische Chemie Neue Folge, vol. 124 (1981), pp. 223–248).

* cited by examiner

*Primary Examiner*—John Goodrow
(74) *Attorney, Agent, or Firm*—Susan S. Jackson; Scott E. Hanf

(57) ABSTRACT

Use of metal carboxylates and sulfonates as charge control agents Metal carboxylates and metal sulfonates are employed as charge control agents in electrophotographic toners and developers, as charge improvers in powder coating materials and electret materials, and in electrostatic separation processes.

13 Claims, No Drawings

USE OF METAL CARBOXYLATES AND SULFONATES AS CHARGE CONTROL AGENTS

CROSS REFERENCE TO RELATED APPLICATIONS

The present invention is described in the German priority application No. 198 37 522.0, filed Aug. 19, 1998, which is hereby incorporated by reference as is fully disclosed herein.

BACKGROUND OF THE INVENTION

The present invention lies within the technical field of charge control agents in toners and developers for electrophotographic recording processes, in powders and powder coating materials for surface coating, and in electret materials, especially in electret fibers, and in separation processes.

In electrophotographic recording processes a latent charge image is produced on a photoconductor. This latent charge image is developed by applying an electrostatically charged toner which is then transferred to, for example, paper, textiles, foils or plastic and is fixed by means, for example, of pressure, radiation, heat or the action of solvent. Typical toners are one- or two-component powder toners (also known as one- or two-component developers); also used are speciality toners, such as magnetic toners, liquid toners or polymerization toners, for example. By polymerization toners are meant those toners which are formed by, for example, suspension polymerization (condensation) or emulsion polymerization and lead to improved particle properties in the toner. Also meant are those toners produced basically in nonaqueous dispersions.

One measure of the quality of a toner is its specific charge q/m (charge per unit mass). In addition to the sign and level of the electrostatic charge, the principal, decisive quality criteria are the rapid attainment of the desired charge level and the constancy of this charge over an extended activation period. In addition to this, the insensitivity of the toner to climatic effects such as temperature and atmospheric humidity is a further important criterion for its suitability.

Both positively and negatively chargeable toners are used in copiers and laser printers, depending on the type of process and type of apparatus.

To obtain electrophotographic toners or developers having either a positive or negative charge, it is common to add charge control agents. Since the charge of toner binders is in general heavily dependent on the activation period, the function of a charge control agent is, on the one hand, to set the sign and level of the toner charge and, on the other hand, to counteract the charge drift of the toner binder and to provide for constancy of the toner charge.

Charge control agents which are not able to prevent the toner or developer from showing a high charge drift (ageing) during a prolonged period of use, and which even cause the toner or developer to undergo charge inversion, are hence unsuitable for practical use.

Another important practical requirement is that the charge control agents should have sufficient thermal stability and good dispersibility. Typical temperatures at which charge control agents are incorporated into the toner resins, when using kneading apparatus or extruders, are between 100° C. and 200° C. Accordingly, thermal stability at 200° C. is of great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn dark yellow or dark brown and the charge control effect to be wholly or partly lost. Typical toner binders are addition polymerization, polyaddition and polycondensation resins, such as styrene, styrene-acrylate, styrene-butadiene, acrylate, polyester and phenol-epoxy resins, and also cycloolefin copolymers, individually or in combination, which may also include further components, examples being colorants, such as dyes, pigments, waxes or flow assistants, or may have these components added subsequently, such as highly disperse silicas.

Apart from their use in electrophotographic toners and developers, charge control agents may also be used to improve the electrostatic charge of powders and coating materials, especially in triboelectrically or electrokinetically sprayed powder coating materials as are used to coat surfaces of articles made from, for example, metal, wood, plastic, glass, ceramic, concrete, textile material, paper or rubber. Powder coating technology is used, for example, when coating articles such as garden furniture, camping equipment, domestic appliances, vehicle parts, refrigerators and shelving and for coating workpieces of complex shape. The powder coating material, or the powder, receives its electrostatic charge, in general, by one of the two following methods:

In the case of the corona method, the powder coating material or powder is guided past a charged corona and is charged in the process; in the case of the triboelectric or electrokinetic method, the principle of frictional electricity is utilized.

The powder coating material or powder in the spray apparatus receives an electrostatic charge which is opposite to the charge of its friction partner, generally a hose or spray pipe made, for example, from polytetrafluoroethylene.

It is also possible to combine the two methods. Typical powder coating resins employed are epoxy resins, carboxyl- and hydroxyl-containing polyester resins, polyurethane resins and acrylic resins, together with the customary hardeners. Resin combinations are also used. For example, epoxy resins are frequently employed in combination with carboxyl- and hydroxyl-containing polyester resins.

The disadvantage of insufficient charging can be seen above all in triboelectrically or electrokinetically sprayed powders and powder coating materials which have been prepared using polyester resins, especially carboxyl-containing polyesters, or using so-called mixed powders, also referred to as hybrid powders. By mixed powders are meant powder coating materials whose resin base consists of a combination of epoxy resin and carboxyl-containing polyester resin. The mixed powders form the basis for the powder coating materials used most commonly in practice. Inadequate charging of the abovementioned powders and powder coating materials results in an inadequate deposition rate and inadequate throwing power on the workpiece to be coated. The term "throwing power" is a measure of the extent to which a powder or powder coating material is deposited on the workpiece to be coated, including its rear faces, cavities, fissures and, in particular, its inner edges and corners.

It has additionally been found that charge control agents are able to improve considerably the charging and the charge stability properties of the electret materials, especially electret fibers (DE-A43 21 289). Electret fibers have hitherto been described mainly in connection with the problem of filtering very fine dusts. The filter materials described differ both in respect of the materials of which the fibers consist and with regard to the manner in which the electrostatic charge is applied to the fibers. Typical electret materials are based on polyolefins, halogenated polyolefins, polyacrylates, polyacrylonitriles, polystyrenes or fluoropolymers, for example polyethylene, polypropylene, polytetrafluoroethylene and perfluorinated ethylene and propylene, or on polyesters, polycarbonates, polyamides, polyimides, polyether ketones, on polyarylene sulfides, especially polyphenylene sulfides, on polyacetals, cellulose esters, polyalkylene terephthalates, and mixtures thereof. Electret materials, especially electret fibers, can be used, for example, to filter (very fine) dusts. The electret materials can receive their charge in a variety of ways, for instance by corona or triboelectric charging.

It is additionally known that charge control agents can be used in electrostatic separation processes, especially in processes for the separation of polymers. For instance, using the example of the externally applied charge control agent trimethylphenylammonium tetraphenyl borate, Y. Higashiyama et al. (J. Electrostatics 30, (1993) 203–212) describe how polymers can be separated from one another for recycling purposes. Without charge control agents, the triboelectric charging characteristics of low-density polyethylene (LDPE) and high-density polyethylene (HDPE) are extremely similar. Following the addition of charge control agent, LDPE takes on a highly positive and HDPE a highly negative charge, and the materials can thus be separated easily. In addition to the external application of the charge control agents it is also possible to conceive in principle of their incorporation into the polymer in order, for example, to shift the position of the polymer within the triboelectric voltage series and to obtain a corresponding separation effect. In this way it is possible to separate other polymers as well, such as polypropylene (PP) and/or polyethylene terephthalate (PET) and/or polyvinyl chloride (PVC), from one another.

Salt minerals, for example, can likewise be separated with particularly good selectivity if they are surface-treated beforehand (surface conditioning) with an additive which improves the substrate-specific electrostatic charging (A. Singewald, L. Ernst, Zeitschrift fur Physikal. Chem. Neue Folge, Vol. 124 (1981) 223–248). Charge control agents are employed, furthermore, as "electroconductivity providing agents" (ECPAs) in inks for inkjet printers (JP 05 163 449-A).

Charge control agents are known from numerous literature references. However, the charge control agents known to date have a number of disadvantages, which severely limit their use in practice or even, in some cases, render it impossible; examples of such disadvantages are inadequate thermal stability, inherent odor, poor dispersibility or low stability in the toner binder (decomposition, migration). A particular weakness of many common commercial charge control agents is the inadequacy of their activity with respect to the desired sign of the charge (positive or negative charge), charge level or charge constancy.

A further important aspect is that charge control agents should be ecotoxicologically unobjectionable.

SUMMARY OF THE INVENTION

The object of the present invention was therefore to find particularly effective and ecotoxicologically compatible charge control agents. The intention is that the compounds should not only permit the rapid attainment and constancy of the charge but should also be of high thermal stability. Furthermore, these compounds should be readily dispersible, without decomposition, in various toner binders employed in practice, such as polyesters, polystyrene-acrylates or polystyrene-butadienes/epoxy resins and also cycloolefin copolymers. Furthermore, their action should be largely independent of the resin/carrier combination, in order to open up broader applicability. They should likewise be readily dispersible, without decomposition, in common powder coating binders and electret materials, such as polyester (PES), epoxy, PES-epoxy hybrid, polyurethane, acrylic systems and polypropylenes.

In terms of their electrostatic efficiency the charge control agents should be active even at very low concentration (1% or less) and should not lose this efficiency when in conjunction with carbon black or other colorants. Indeed, it is known of colorants that they can affect—in some cases lastingly—the triboelectric charging of toners.

A negatively charged toner consisting of toner resin, colorant and a metallic additive for charge enhancement, obtainable from the reaction of a metal ion with one molar equivalent of an ortho-hydroxyphenol and two molar equivalents of an aromatic carboxylic acid in aqueous solution in the presence of a base, is described in U.S. Pat. No. 5,571,654.

A toner consisting of resin, pigment and a three-way mixture as charge additive, in which the side chain of an aromatic carboxyl compound represents an alkoxy group, is described in U.S. Pat. No. 5,484,678.

Finally, U.S. Pat. No. 5,346,793 describes a negatively charged toner consisting of resin particles, pigment particles and a charge enhancing additive obtainable from the reaction of an inorganic aluminum salt solution and an alkoxy-substituted benzoic acid.

DESCRIPTION OF THE PREFERRED EMBODIMENTS

Surprisingly it has now become evident that metal carboxylates and metal sulfonates defined below have good charge control properties, especially for negative charges and high thermal stability, the charge control property being lost neither by combination with carbon black nor by a combination with other colorants. Furthermore, the compounds are readily compatible with the customary toner, powder coating and electret binders and are easy to disperse.

The present invention provides for the use of metal carboxylates and metal sulfonates as charge control agents in electrophotographic toners and developers, as charge improvers in powder coating materials, electret materials and in electrostatic separation processes, the metal carboxylates and metal sulfonates being prepared by reacting an acid $A^1$ and an acid $A^2$ in an aqueous alkaline medium, or by reacting an alkali metal salt of the acid $A^1$ and of the acid $A^2$, with a water-soluble metal salt, wherein $A^1$ is a) an acid of formulae (I) to (VIII)

(I)

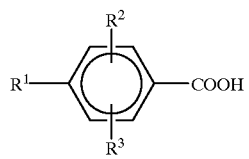

in which $R^1$ is a linear or branched alkyl radical with 1 to 18 carbon atoms, $R^2$ and $R^3$ are identical or different and are hydrogen, $C_1$–$C_8$-alkyl, $(C_1$–$C_8)$-hydroxyalkylene, $C_6$–$C_{10}$-aryl, heteroaryl, e.g. pyridyl, imidazolyl, pyrazolyl, quinolinyl, isoquinolinyl, benzimidazolyl or indolyl, it being possible for aryl and heteroaryl to be substituted by from 1 to 3 of the radicals carboxyl, hydroxyl, $C_1$–$C_4$-alkoxy, $C_1$–$C_4$-alkyl, $C_1$–$C_4$-acyl, halogen, hydroxy-$(C_1$–$C_4)$-alkyl and amino, or are nitro, cyano, fluoro, chloro, bromo or $C_1$–$C_4$-acyl;

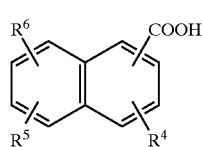

(II)

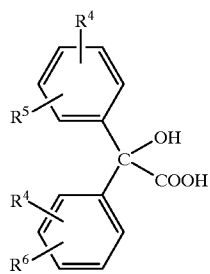

(III)

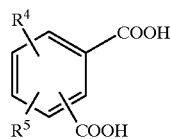

(IV)

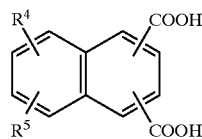

(V)

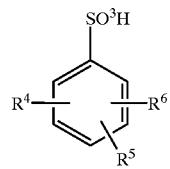

(VI)

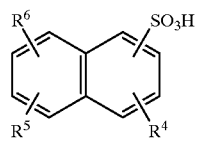

(VII)

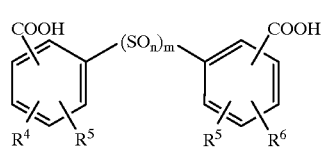

(VIII)

in which $R^4$, $R^5$ and $R^6$ are identical or different and are hydrogen, $C_1$–$C_8$-alkyl, $(C_1$–$C_8)$-hydroxyalkylene, $C_6$–$C_{10}$-aryl, heteroaryl, e.g. pyridyl, imidazolyl, quinolinyl, isoquinolinyl or benzimidazolyl, it being possible for aryl and heteroaryl to be substituted from 1 to 3 of the radicals carboxyl, hydroxyl, C,–$C_4$-alkoxy, C,–$C_4$-alkyl, halogen, hydroxy-$(C_1$–$C_4)$-alkyl and amino, or are nitro, cyano, fluoro, chloro, bromo or $C_1$–$C_4$-acyl;

m is 1, 2 or 3, and n is 0, 1 or 2;

b) a heteroaromatic mono- or dicarboxylic acid;

c) a polyanion-forming compound from the group consisting of poly(styrenesulfonic acid), poly(acrylic acid), poly(methacrylic acid), poly(maleic acid), poly (anetholsulfonic acid), poly(itaconic acid), polyvinyl sulfate), poly(vinylsulfonic acid), poly(acrylic acid-co-maleic acid), poly(styrenesulfonic acid-co-maleic acid), poly(ethylene-co-acrylic acid), hectorite, bentonite, algic acid, pectic acid, kappa-, lambda-, and iota-carrageenans, xanthan, gum arabic, dextran sulfate, carboxymethyldextran, carboxymethylcellulose, cellulose sulfate, starch sulfate, lignosulfonates, gum karaya; polygalacturonic acid, polyglucuronic acid, polyguluronic acid, polymannuronic acid and copolymers thereof, chondroitin sulfate, heparin, heparan sulfate, hyaluronic acid, dermatan sulfate, keratan sulfate; and derivatives of starch, amylose, amylopectin, cellulose, guaran, gum arabic, gum karaya, guar gum, pullulan, xanthan, dextran, curdlan, gellan, carubin, agarose, chitin, and chitosan having the following functional groups in various degrees of substitution:

carboxymethyl and carboxyethyl, carboxypropyl, 2-carboxyvinyl, 2-hydroxy-3-carboxypropyl, 1,3-dicarboxyisopropyl, sulfomethyl, 2-sulfoethyl, 3-sulfopropyl, 4-sulfobutyl, 5-sulfopentyl, 2-hydroxy-3-sulfopropyl, 2,2-disulfoethyl, 2-carboxy-2-sulfoethyl, maleate, succinate, phthalate, glutarate, aromatic and aliphatic dicarboxylates, xanthogenate, sulfate, phosphate, 2,3-dicarboxy, N,N-di(phosphatomethyl)aminoethyl, N-alkyl-N-phosphatomethyl-aminoethyl, it being possible for these derivatives as well to contain nonionic functional groups in various degrees of substitution, such as, for example, methyl, ethyl, propyl, isopropyl, 2-hydroxyethyl, 2-hydroxypropyl and 2-hydroxybutyl groups and also esters with alipahtic carboxylic acids ($C_2$ to $C_{18}$)

and of the formula (X)

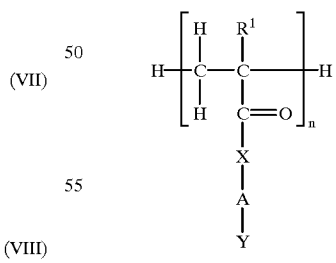

(X)

where n=5 to $5 \times 10^5$; and $R^1$, X, A and Y are each identical or different and defined as follows:

$R^1$=H or $CH_3$;

X=O or NH;

A=branched or linear $(C_1$–$C_{18})$-alkylenes or arylenes, e.g. phenylene or naphthylene;

Y=$SO_3$, COO, N⊕$R^3{}_2$—A—COO, N⊕$R^3{}_2$—A—$SO_3$⊕, N⊕$R^3{}_2$—A—PO(OH)O⊕ where $R^3$=$C_1$–$C_8$-alkyl;

and also copolymers consisting of monomers of the above-mentioned compounds and one or more of the following monomers in varying composition: acrylic acid, methacrylic acid, acrylic acid alkyl-($C_1$–$C_{15}$)-ester, methacrylic acid alkyl($C_1$–$C_{18}$) ester, glycidyl methacrylate, acrylamide, acrylonitrile, methacrylonitrile, ethylene, styrene, α-methylstyrene, styrenesulfonic acid, butadiene, butene, isoprene, vinyl chloride, propylene, maleic anhydride, maleic acid, maleic acid monoalkyl($C_1$–$C_{18}$) or dialkyl-($C_1$–$C_{18}$) ester, alkyl-($C_1$–$C_{18}$) vinyl ether, vinyl alcohol, vinyl acetate, vinylbutyral, vinylimidazole, N-vinyl-2-caprolactam, N-vinylpyrrolidone, mono- or dialkylated ($C_1$–$C_{30}$) N-vinylpyrrolidone,vinylsulfonic acid, diallyidim-ethylammonium chloride, vinylidene chloride, poly (ethylene glycol) methacrylate, poly(ethylene glycol) acrylate;

d) a carboxyl- and/or sulfo-containing polyester;

$A^2$ is an acid of formulae (I) to (VIII);

an acid of formula (IX)

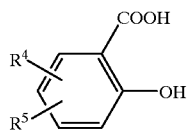

(IX)

in which $R^4$ and $R^5$ are as defined above;

or a heteroaromatic mono or dicarboxylic acid;

or by reacting an acid $A^1$ as defined in c) or d) with an acid $A^2$ in the definition of the formulae (I) to (IX) in which RI to $R^6$ have the definitions specified above and in addition the definitions ($C_1$–$C_{18}$)-alkoxy, hydroxyl, amino, ($C_1$–$C_{18}$)alkylamino, di($C_1$–$C_{18}$)alkylamino, ($C_1$–$C_{18}$)alkylene-$NR^7R^8$, in which $R^7$ and $R^8$ are hydrogen or $C_1$–$C_8$-alkyl; and the cation of the metal is divalent or trivalent.

The preparation of the metal carboxylates and metal sulfonates in an aqueous alkaline medium is judiciously performed at a temperature between 0 and 1 00° C, preferably between 10 and 90° C., and, in particular, between 15 and 85° C., under superatmospheric pressure if desired.

In the case of a divalent metal, the acids $A^1$ and $A^2$ employed are different.

The water-soluble metal salt, the acid $A^1$ and the acid $A^2$ are judiciously each employed in approximately equimolar amounts; in the case of the acids, there may be deviations of in each case up to 90 mol %.

The water-soluble metal salt can, however, also be added in an excess: for example, in a from 1.1 to 6 times molar excess per carboxylate or sulfonate radical. Compounds of the formula (1)

$$A^{10}—M^2—A^{20} \qquad (1)$$

may be formed, where $M^2$ is the divalent metal, $A^{10}$ is the acid radical of the acid $A^1$ and $A^{20}$ is the acid radical of the acid $A^2$, or else, exclusively or partly, a mixture of the compounds of the formulae $A^{10}—M^2—A^{10}$ and $A^{20}—M^2—A^{20}$ is formed.

In the case of a trivalent metal the water-soluble metal salt, the acid $A^1$ and the acid $A^2$ can be employed in the same proportions as described above for divalent metals. In this case, the third ligand of the trivalent metal is a hydroxyl group.

In this case, the acids $A^1$ and $A^2$ employed can be identical or different, and it is possible for compounds of the formula (2)

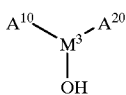

(2)

to be formed where $A^{10}$=acid radical of the acid $A^1$, $A^{20}$=acid radical of the acid $A^2$ and $M^3$=trivalent metal.

Where the acids $A^1$ and $A^2$ employed are identical, $A^{10}=A^{20}$

Where the acids $A^1$ and $A^2$ employed are different, i is possible for compounds of the formula (2) having correspondingly different acid radicals $A^{10}$ and $A^{20}$ to be formed. However, it is also possible that, partly or exclusively, a mixture of the compounds $(A^{10})_2M^3OH$ and $(A^{20})_2M^3OH$ is formed.

In the case of a trivalent metal it is, however, also possible to employ the acids $A^1$ and $A^2$ and the metal salt in a molar ratio of about 2:1:1 or 1:2:1, in which case there may be deviations of in each case up to 90 mol % between the acids. In this case it is also possible for the third ligand of the trivalent metal to be an acid radical of the acid $A^1$ or $A^2$. Here again, the water-soluble metal salt can be employed, for example, in a from 1.1 to 6 times molar excess per carboxylate or sulfonate group. It is also possible here for a mixture of two or more of the compounds $(A^{10})_3M^3$, $(A^{10})_2(A^{20})M^3$, $(A^{20})_2(A^{10})M^3$ and $(A°)_3M^3$ to be formed if such a mixture precipitates more rapidly from the aqueous solution than does the compound of the formula (2a)

$$A^{10}A^{20}A^{30}M^3 \qquad (2a)$$

where $A^{30}$=acid radical $A^{10}$ or $A^{20}$.

In particular when the alkaline medium, for example the sodium hydroxide solution, is employed in excess, acid radicals in the said mixture can be replaced by OH.

Preferred metal cations $M^{2+}$ are $Zn^{2+}$, $Fe^{2+}$, Co2+, $Mn^{2+}$, N?2+, $Cu^{24}$, $Mg^{2+}$, $Ca^{2+}$,$Sr^{2+}$ and $Ba^{2+}$.

Preferred metal cations $M^{3+}$ are $Al^{3+}$, $Fe^{3+}$, $Mn^{3+}$and $Co^{3+}$.

Water-soluble metal salts employed are preferably salts of said cations with anions from the group consisting of fluoride, chloride, bromide, sulfate, hydrogen sulfate, carbonate, hydrogencarbonate, nitrate and hydroxide with which sufficient water-solubility in alkaline solution is provided. The pH of the alkaline solution is adjusted to from 7.5 to 13 using a metal hydroxide M'OH, $M^2(OH)_2$ or $M^3(OH)_3$, preferably NaOH. It is also possible to employ the above-described metal cations directly in the form of their hydroxides.

A judicious procedure is to slurry the acids $A^1$ and $A^2$ in water, adjust said pH using NaOH, and meter in a solution of water-soluble metal salt. The desired product usually precipitates and is isolated and dried.

Preferred acids $A^1$ in the context of the present invention are a)

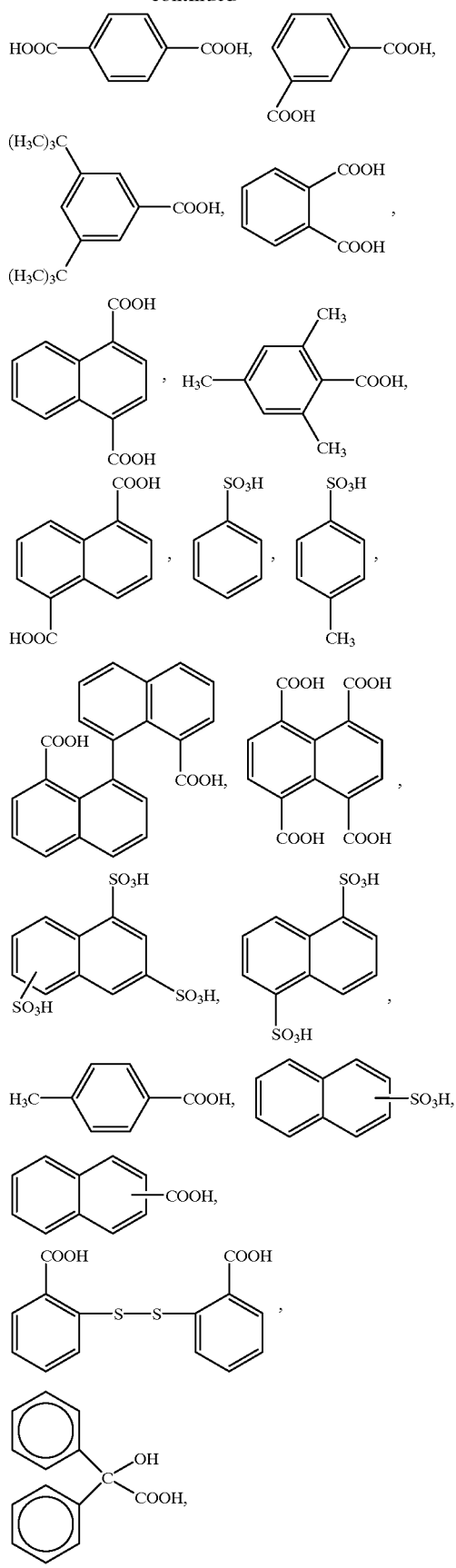

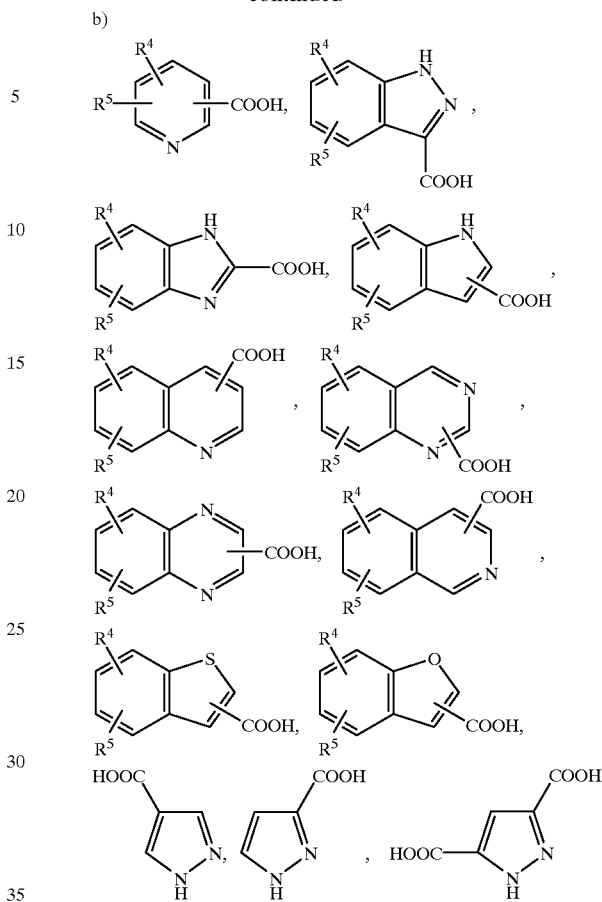

c) poly(methacrylic acid), poly(styrenesulfonic acid), poly(ethylenesulfonic acid), poly(styrenesulfonic acid-co-maleic acid 1:1), d) polyester consisting of the reaction product of the individual components i), ii) and iii) and also, if desired, iv) and, if desired, v), where
   i) is a dicarboxylic acid or a reactive derivative of a dicarboxylic acid which is free from sulfo groups,
   ii) is a difunctional aromatic, aliphatic or cycloaliphatic sulfo compound whose functional groups are hydroxyl or carboxyl, or hydroxyl and carboxyl,
   iii) is an aliphatic, cycloaliphatic or aromatic diol, a polyether diol or a polycarbonate diol,
   iv) is a polyfunctional compound (functionality >2), whose functional groups are hydroxyl or carboxyl, or hydroxyl and carboxyl, and
   v) is a monocarboxylic acid or a sulfo-containing monoalcohol.

Particularly preferred acids $A^1$ from groups a) to d) are:

a)

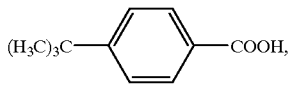

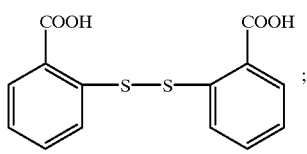

b)

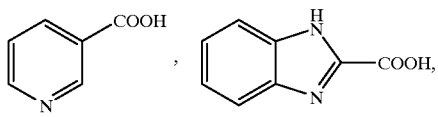

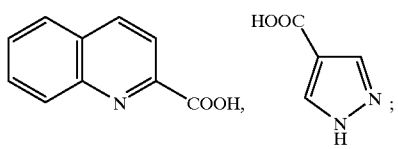

c) poly(methacrylic acid), poly(styrenesulfonic acid), poly(styrenesulfonic acid-co-maleic acid 1:1);

d) a polyester of dimethyl-5-sulfoisophthalic acid, terephthalic acid, isophthalic acid and neopentyl glycol, propylene glycol and ethylene glycol;

a polyester of 5-suffoisophthalic acid, terephthalic acid, isophthalic acid and neopentyl glycol, trimethyloipropane and ethylene glycol;

a polyester of 5-sulfoisophthalic acid, terephthalic acid, isophthalic acid, cyclohexane-1,3-dicarboxylic acid and neopentyl glycol and ethylene glycol, and a polyester of 5sulfoisophthalic acid, terephthalic acid, isophthalic acid, cyclohexane-1,3-dicarboxylic acid and ethylene glycol, propylene glycol and isethionic acid.

Preferred acids $A^2$ in the context of the present invention are

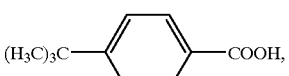

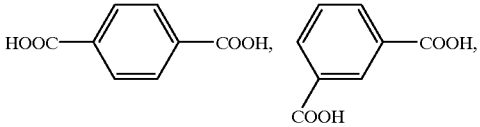

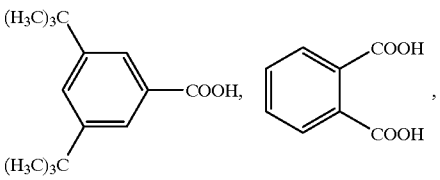

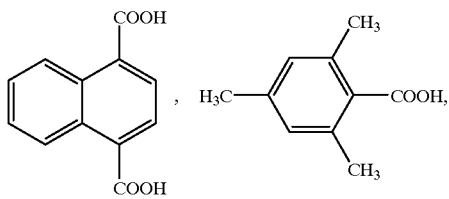

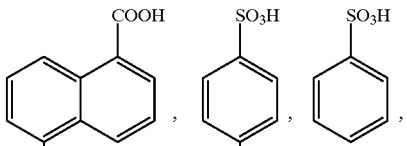

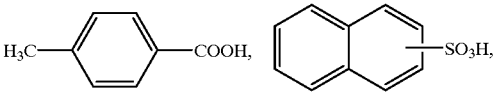

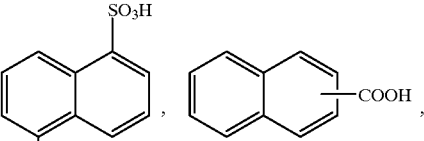

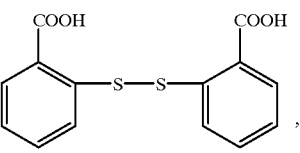

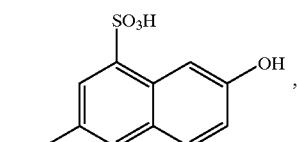

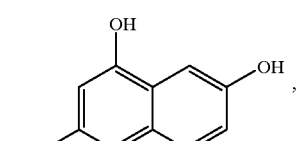

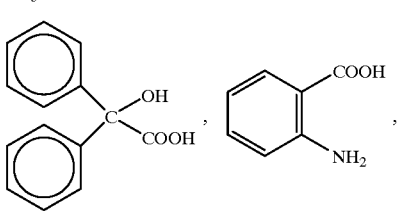

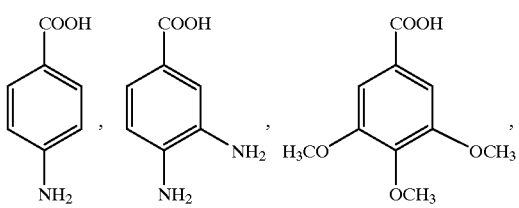

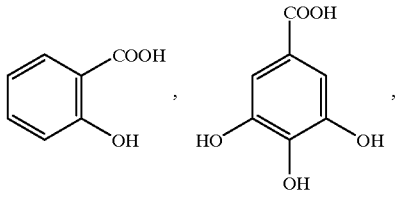

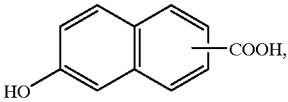

-continued

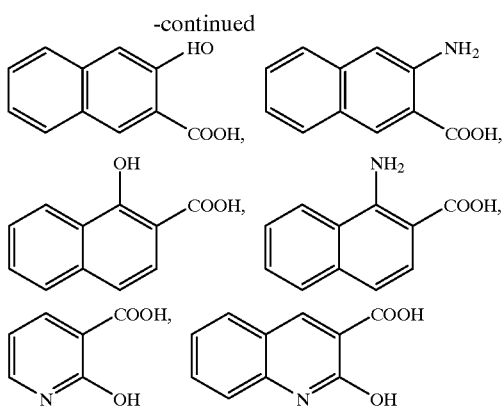

Particularly preferred metal carboxylates and metal sulfonates for the purposes of the present invention are compounds of the formula (1) in which
$A^{10}$ is 4-tert-butylbenzoate, poly(ethylenesulfonate), poly(styrenesulfonate), poly(methacrylate), diphenyl disulfide 2,2'-dicarboxylate,
$A^{20}$ is 4-tert-butylbenzoate, diphenyl disulfide 2,2'-dicarboxylate, salicylate and $M^{2+}$ is $Zn^{2+}$,
or a compound of the formula (2) in which
$A^{10}$ and $A^{20}$ are as defined above,
$A^{30}$ is OH, poly(methacrylate), poly(styrenesulfonate), poly(ethylenesulfonate), salicylate or diphenyl disulfide 2,2'-dicarboxylate, and
$M^{3+}$ is $Al^{3+}$.

The molar mass of the polyanion-forming compounds of group c) can vary within wide limits, for example from $M_w$=1000 g/mol to $M_w$=100 000 000 g/mol.

The carboxyl- and/or sulfo-containing polyesters of group d) are described, for example, in EP-A²-0 644 463, especially in the Preparation Examples therein under 1.1.

The metal carboxylates and metal sulfonates used in accordance with the invention can be matched precisely to the particular resin/toner system. A further factor is that the compounds employed in accordance with the invention are free-flowing and possess high and particularly constant charge control properties, good thermal stabilities and good dispersibilities. A further technical advantage of these compounds is that they are inert toward the various binder systems and can therefore be employed widely, it being particularly significant that they are not dissolved in the polymer matrix but rather are present as small, very finely divided solid structures.

Dispersion means the distribution of one substance within another, i.e. in the context of the invention the distribution of a charge control agent in the toner binder, powder coating binder or electret material.

It is known that crystalline substances in their coarsest form are present as agglomerates. To achieve homogeneous distribution within the binder, these agglomerates must be disrupted by the dispersing operation into smaller aggregates, or ideally, into primary particles. The particles of charge control agent present in the binder following dispersion should be smaller than 1 μm, preferably smaller than 0.5 μm, with a narrow particle size distribution being of advantage.

For the particle size, defined by the $d_{50}$ value, there are optimum ranges of activity depending on the material. For instance, coarse particles (-1 mm) can in some cases not be dispersed at all or can be dispersed only with considerable investment of time and energy, whereas very fine particles in the submicron range harbor a heightened safety risk, such as the possibility of dust explosion.

The particle size and form is established and modified either by the synthesis and/or by aftertreatment. The required property is frequently possible only through control of the treatment, such as milling and/or drying. Various milling techniques are suitable for this purpose. Examples of advantageous technologies are airjet mills, cutting mills, hammer mills, bead mills and impact mills.

The binder systems mentioned in connection with the present invention are, typically, hydrophobic materials. High levels of water in the charge control agent can either oppose wetting or else promote dispersion (flushing). The practicable moisture content is therefore specific to the particular material.

The compounds employed in accordance with the invention feature the following chemical/physical properties:

The water content, determined by the Karl-Fischer method, is between 0.01% and 30%, preferably between 0.05 and 25% and, with particular preference, between 0.05 and 20%, it being possible for the water to be in adsorbed and/or bonded form, and for its proportion to be adjusted by the action of heat at up to 200° C. and reduced pressure down to $10^{-8}$ torr or by addition of water.

The particle size, determined by means of evaluation by light microscope or by laser light scattering, and defined by the devalue, is between 0.01 μm and 1000 μm, preferably between 0.1 and 500 μm, and with very particular preference between 0.2 and 400 μm.

It is particularly advantageous if milling results in a narrow particle size fraction. Preference is given to a range $\Delta(d_{95}-d_{50})$ of less than 500 μm, in particular less than 200 μm.

The metal carboxylates and metal sulfonates employed in accordance with the invention can also be combined with further positive or negative charge control agents in order to obtain good performance chargeabilities, the overall concentration of these charge control agents being between 0.01 and 50% by weight, preferably between 0.1 and 5% by weight, based on the overall weight of the electrophotographic toner, developer, powder or powder coating material.

Examples of suitable further charge control agents are: triphenylmethane; ammonium and immonium compounds, iminiumcompounds, fluorinated ammonium and fluorinated immonium compounds; biscationic acid amides; polymeric ammonium compounds; diallylammonium compounds; aryl sulfide derivatives, phenol derivatives; phosphonium compounds and fluorinated phosphonium compounds; calix(n) arenes, cyclically linked oligosaccharides (cyclodextrins) and their derivatives, especially boric ester derivatives, interpolyelectrolyte complexes (IPECs); polyester salts; benzimidazolones; azines, thiazines or oxazines, which are listed in the Colour Index as Pigments, Solvent Dyes, Basic Dyes or Acid Dyes, or metal azo complex dyes.

The metal carboxylates and metal sulfonates used in accordance with the invention and, if desired, further charge control agents are incorporated individually or in combination with one another in a concentration of from 0.01 to 50% by weight, preferably from 0.5 to 20% by weight, particularly preferably from 0.1 to 5.0% by weight, based on the overall mixture, into the binder of the respective toner, developer, coating material, powder coating material, electret material or of the polymer which is to be electrostatically separated, said incorporation being homogeneous and taking place, for example, by means of extrusion or kneading, beadmilling or using an Ultra-Turrax (high-speed stirrer). In this context the compounds employed in accordance with the invention can be added as dried and milled powders, dispersions or solutions, press cakes, masterbatches, preparations, made-up pastes, as compounds applied from aqueous or non aqueous solution to appropriate carriers such as silica gel, $TiO_2$, $Al_2O_3$ or carbon black, for example, or mixed with such carriers, or added in some other form. Similarly, the compounds used in accordance with the invention can also in principle be added even during the preparation of the respective binders, i.e., in the course of their addition polymerization, polyaddition or polycondensation.

The present invention additionally provides an electrophotographic toner comprising a customary binder, for example a styrene, styrene-acrylate, styrene-butadiene, acrylate, acrylic, polyester or epoxy resin or a combination of the last two, and from 0.01 to 50% by weight, preferably from 0.5 to 20% by weight, and, with particular preference, from 0.1 to 5% by weight, based in each case on the overall weight of the electrophotographic toner, and at least one metal carboxylate or metal sulfonate, alone or in combination with one or more of the above-described additional charge control agents.

The electrophotographic toner can additionally comprise from 1 to 10% by weight, preferably from 2 to 8% by weight, of a colorant, for example, a dye, an organic or inorganic color pigment or a black pigment, such as carbon black, for example.

The present invention also provides a powder coating material comprising a customary binder, such as a urethane, acrylic, polyester or epoxy resin or a combination thereof, and from 0.01 to 50% by weight, preferably from 0.5 to 20% by weight and, with particular preference, from 0.1 to 5% by weight, based in each case on the overall weight of the powder coating material, of at least one metal carboxylate or metal sulfonate, alone or in combination with one or more of the above-described additional charge control agents. The powder coating material can additionally contain from 1 to 10% by weight, preferably from 2 to 8% by weight, of a colorant, for example a dye, an organic or inorganic color pigment or a black pigment, such as carbon black, for example.

EXAMPLES

In the examples below, parts and percentages are by weight.

Preparation Example 1

7.44g of 4-tert-butylbenzoic acid (0.0413 mol) were suspended in 400 ml of deionized water, 24.8 ml of 10% strength NaOH solution (0.062 mol) were added, and the mixture was stirred at room temperature until the organic acid had dissolved. Then a solution of 6.64 g of aluminum sulfate hydrate (0.0207 mol) in 40 ml of deionized water was added dropwise over the course of 10 minutes. A fine white precipitate formed. After the end of addition of aluminum sulfate, the precipitate was stirred for 15 minutes, then filtered off with suction, washed several times with deionized water and finally dried at 60° C. and 100 mbar for 24 h.

Yield: 7.6 g (92% of theory).
Elemental analysis:
    Calculated: 66.3% C, 6.8% H, 20.1% 0, 6.8% Al
    Found: 60.9% C, 6.4% H, 17.0% 0, 8.1% Al
DTA: no decomposition up to 400° C.
Thermal analysis (Kofler bench): the substance at 1% in a styrene-acrylate resin (®Dialec) shows virtually no discoloration up to 250° C.
pH: 5.4±0.8
Conductivity: 1100±200 $\mu$S/cm
$H_2O$ content (Karl-Fischer method): 1.3±0.3%
Capacitance (1 kHz): 18.6 pF
$\epsilon$(1 kHz): 0.075
$tan\delta$(1 kHz): 4.2
Spec. resistance: $10^{15}$ $\Omega$cm
Crystallinity: very high crystallinity (>95%, by X-ray); numerous sharp reflection peaks between 2theta 5° and 35° (main peaks: 6.6°, 7.00, 15.2° and 21.40 and 21.70)
IR: $v=3700$ $cm^{-1}$, 3660-3100, 2960,2900, 2860, 1690,1600, 1560, 1510, 1430, 1370, 1280, 1200, 1110, 1020, 990, 860, 790, 720.
Particle size distribution: $d_{50}=14.5$ $\mu$m, $d_{45}=48.8$ $\mu$m.

Preparation Example 2

6.48 g of 4-tert-butylbenzoic acid (0.036 mol) were suspended in 4.68 g of Na-poly-(ethylenesulfonate) (0.036 mol) in 400 ml of deionized water, and 15.4 ml of 10% strength NaOH-solution (0.036 mol) were added. The mixture was stirred at room temperature until all of the constituents had dissolved. A solution of 10 9 of zinc chloride (0.072 mol) in 50 ml of deionized water was then added dropwise to the first solution, giving a white precipitate. This precipitate was stirred for 15 minutes then filtered off on a suction filter, washed several times with deionized water and dried at 60° C. and 100 mbar for 24 h.

Yield: 8.0 9 (64% of theory).
DTA: endothermic peaks at 75° C. and 205° C.
Capacitance (1 kHz): 529 pF
$\epsilon$(1 kHz): 25
Spec. resistance: <$5\times10^6$ $\Omega$cm
$H_2O$-content: 3.7%

Preparation Example 3

5.02 g of salicylic acid (0.036 mol) were suspended in 12.96 g of Na-poly-(methacrylate) (0.036 mol) in 400 ml of deionized water, and 14.4 ml of 10% strength NaOH-solution (0.036 mol) were then added with stirring at room temperature. A solution of 10 g of zinc chloride (0.072 mol) in 50 ml of deionized water was then added dropwise to the first, clear solution, giving a white precipitate. This precipitate was stirred for 15 minutes then filtered off on a suction filter, washed several times with deionized water and dried at 60° C. and 100 mbar for 24 h.

Yield: 6.0 9 (58% of theory).
DTA: melting peak at 114° C.
Crystallinity: virtually X-ray amorphous (one very broad peak at 2theta=9.7°)

Preparation Example 4

7.44 g of diphenyl disulfide 2,2'-dicarboxylic acid (0.0207 mol) together with 2.89 g of salicylic acid (0.0207 mol) were suspended in 400 ml of deionized water, and 26.8 ml of 10% strength NaOH solution (0.062 mol) were added at room temperature with stirring. After the two components of the suspension had dissolved, a solution of 20 g of aluminum sulfate hydrate (0.062 mol) in 80 ml of deionized water was added dropwise over the course of 10 minutes. A slightly brownish, fine precipitate formed. This precipitate was stirred for 15 minutes, washed several times with deionized water, filtered off on a suction filter and finally dried at 60° C. and 100 mbar for 24 h.

Yield: 9.1 g (94% of theory).

Further preparation examples, which were synthesized in analogy to the above-described Examples 1 to 4, are reproduced in Table I below.

TABLE 1

| Ex. No. | Metal salt | Anion A1 | Anion A2 | Anion A3 |
|---|---|---|---|---|
| 5 | [Al$_2$(SO$_4$)$_3$] | Na-PMAA | 4-t-butylbenzoic acid | Na-PMAA |
| 6 | [Al$_2$(SO$_4$)$_3$] | Na-PES | 4-t-butylbenzoic acid | Na-PES |
| 7 | [Al$_2$(SO$_4$)$_3$] | Na-P[SSA-co-MA] | 4-t-butylbenzoic acid | Na-P[SSA-co-MA] |
| 8 | [Al$_2$(SO$_4$)$_3$] | 4-t-butylbenzoic acid | 4-t-butylbenzoic acid | Na-PMAA |
| 9 | [Al$_2$(SO$_4$)$_3$] | 4-t-butylbenzoic acid | 4-t-butylbenzoic acid | Na-PSSA |
| 10 | [Al$_2$(SO$_4$)$_3$] | 4-t-butylbenzoic acid | 4-t-butylbenzoic acid | Na-PES |
| 11 | [Al$_2$(SO$_4$)$_3$] | 4-t-butylbenzoic acid | 4-t-butylbenzoic acid | Na-P[SSA-co-MA 1:1] |
| 12 | [Al$_2$(SO$_4$)$_3$] | 1M Na-PMAA | 4-t-butylbenzoic acid | 1M NaOH |
| 13 | [Al$_2$(SO$_4$)$_3$] | Na-PSSA | 4-t-butylbenzoic acid | NaOH |
| 14 | [ZnCl$_2$] | Na-PMAA | 4-t-butylbenzoic acid | — |
| 15 | [ZnCl$_2$] | Na-PSSA | 4-t-butylbenzoic acid | — |
| 16 | [ZnCl$_2$] | Na-P[SSA-co-MA 1:1] | 4-t-butylbenzoic acid | — |
| 17 | [ZnCl$_2$] | Na-PSSA | salicylic acid | — |
| 18 | [ZnCl$_2$] | Na-PES | salicylic acid | — |
| 19 | [ZnCl$_2$] | Na-PMAA | ½ diphenyl disulfide dibenzoic acid | — |
| 20 | [ZnCl$_2$] | Na-PSSA | ½diphenyl disulfide dibenzoic acid | — |
| 21 | [ZnCl$_2$] | Na-PES | ½diphenyl disulfide dibenzoic acid | — |
| 22 | [ZnCl$_2$] | Na-P[SSA-co-MA 1:1] | ½diphenyl disulfide dibenzoic acid | — |
| 23 | [Al$_2$(SO$_4$)$_3$] | ½diphenyl disulfide dibenzoic acid | ½diphenyl disulfide dibenzoic acid | 4-t-butylbenzoic acid |
| 24 | [Al$_2$(SO$_4$)$_3$] | ½diphenyl disulfide dibenzoic acid | salicylic acid | salicylic acid |
| 25 | [Al$_2$(SO$_4$)$_3$] | 4-t-butylbenzoic acid | ½diphenyl disulfide dibenzoic acid | 4-t-butylbenzoic acid |
| 26 | [Al$_2$(SO$_4$)$_3$] | ½diphenyl disulfide dibenzoic acid | ½diphenyl disulfide dibenzoic acid | NaOH |
| 27 | [Al$_2$(SO$_4$)$_3$] | 4-t-butylbenzoic acid | ½diphenyl disulfide dibenzoic acid | NaOH |
| 28 | [Al$_2$(SO$_4$)$_3$] | ½diphenyl disulfide dibenzoic acid | salicylic acid | NaOH |
| 29 | [ZnCl$_2$] | 4-t-butylbenzoic acid | ½diphenyl disulfide dibenzoic acid | — |
| 30 | [ZnCl$_2$] | ½diphenyl disulfide dibenzoic acid | salicylic acid | — |
| 31 | [ZnCl$_2$] | ionic polyester | 4-t-butylbenzoic acid | — |
| 32 | [ZnCl$_2$] | ionic polyester | salicylic acid | — |

Na-PMAA = sodium-polymethacrylic acid
Na-PSSA = sodium polystyrenesulfonic acid
Na-PES = sodium polyethylene sulfonic acid
Na-P[SSA-co-MA 1:1] = sodium-poly(styrenesulfonic acid-co-maleic acid 1:1)
Ionic polyester = consists of dimethyl-5-sulfoisophthalic acid, terephthalic acid, isophthalic acid and neopentyl glycol, propylene glycol and ethylene glycol.

Characterization of the compound from Preparation Example 14:
Elemental analysis:
  Calculated: 55.0% C, 5.5% H, 19.5% O, 20.0% Zn
  Found: 47.6% C, 5.5% H, 23.5% O, 21.0% Zn
Capacitance (1 kHz): 263 pF
ε(1 kHz): 2.12
Spec. resistance: 7×10$^7$ Ωcm
H$_2$O content: 8.0%
Characterization of the compound from Preparation Example 17:
Crystalinity: 70% crystallinity (X-ray analysis); numerous sharp reflection peaks between 2theta 5° and 350 (main peaks: 7.60, 9.70, 14.90, 15.50 and also 26.0° and 30.00)
H$_2$O content: 5.6%

Use Examples
In the use examples below the following toner binders and carriers are employed:
Toner binders:
Resin 1: 60:40 styrene-methacrylate copolymer
Resin 2: Bisphenol-based polyester (OAlmacryl resin)
Carriers:
Carrier 1: styrene-methacrylate copolymer-coated magnetite particles of size 50 to 200 μm (bulk density 2.62 g/cm$^3$) (FBM 100A; from Powder Techn.)
Carrier 2: silicone-coated ferrite particles of size 50 to 100 μm (bulk density 2.75 glcm$^3$) (FBM 96-1 1A; from Powder Techn.)

Use Example 1

1 part of the compound of the formula

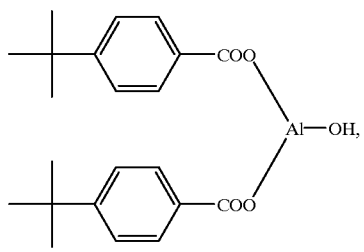

is incorporated homogeneously using a kneader over the course of 45 minutes into 99 parts of a toner binder (60:40 styrene-metahcrylate copolymer, resin 1, ®Dialec S 309). The composition is then ground on a laboratory universal mill and subsequently classified in a centrifugal classifier. The desired particle fraction (4 to 25 μm) is activated with a carrier (Carrier 1).

Use Examples 2 to 33

1 part of each metal carboxylate or metal sulfonate is incorporated into the respective resin using a kneader, as described in Use Example 1.

Electrostatic testing:

Measurement is carried out on a customary q/m measurement stand. By using a sieve having a mesh size of 50 μm it is ensured that no carrier is entrained when the toner is blown out. Measurements are made at 50% relative atmospheric humidity. The q/m values [pC/g] are measured as a function of the activation period. The q/m values of Use Examples 2 to 33 are given in Table 2. The amounts of respective metal carboxylate or metal sulfonate are in each case 1% by weight. q/m values for Use Example 1:

| Activation period [min] | Charge q/m [μC/g] |
|---|---|
| 5 | −15.8 |
| 10 | −23.5 |
| 30 | −37.0 |
| 120 | −53.3 |
| 24 h | −68.6 |

TABLE 2

| Compound from Preparation Ex. No. | Resin | Carrier | q/m [μC/g] after activation time of | | | |
|---|---|---|---|---|---|---|
| | | | 5 min | 10 min | 30 min | 120 min |
| 2 | 1 | 1 | −13.4 | −16.2 | −21.7 | −28.8 |
| 3 | 1 | 1 | −17.0 | −16.6 | −17.9 | −18.0 |
| 4 | 1 | 1 | −12.7 | −14.8 | −17.8 | −20.1 |
| 5 | 1 | 1 | −4.6 | −6.5 | −11.8 | −23.3 |
| 6 | 1 | 1 | −4.5 | −6.1 | −10.1 | −17.6 |
| 7 | 1 | 1 | −4.3 | −5.5 | −9.3 | −16.1 |
| 8 | 1 | 1 | −5.3 | −8.3 | −14.9 | −27.5 |
| 9 | 1 | 1 | −6.1 | −6.3 | −9.1 | −11.9 |
| 10 | 1 | 1 | −7.5 | −8.7 | −13.9 | −21.6 |
| 11 | 1 | 1 | −5.5 | −6.4 | −94 | −15.4 |
| 12 | 1 | 1 | −6.1 | −6.5 | −11.0 | −19.4 |
| 13 | 1 | 1 | −5.1 | −5.9 | −9.0 | −12.3 |
| 14 | 1 | 1 | −10.3 | −13.9 | −19.9 | −25.3 |
| 15 | 1 | 1 | −9.3 | −10.5 | −17.2 | −27.1 |
| 16 | 1 | 1 | −6.9 | −10.2 | −15.0 | −22.9 |
| 17 | 1 | 1 | −10.0 | −9.2 | −9.4 | −10.7 |
| 18 | 1 | 1 | −8.6 | −7.0 | −6.9 | −8.5 |
| 19 | 1 | 1 | −10.7 | −13.5 | −17.8 | −20.7 |
| 20 | 1 | 1 | −4.0 | −6.0 | −8.2 | −11.2 |
| 21 | 1 | 1 | −4.0 | −5.7 | −7.9 | −12.0 |
| 22 | 1 | 1 | −6.8 | −11.1 | −15.4 | −19.0 |
| 23 | 1 | 1 | −6.1 | −7.0 | −10.9 | −17.2 |
| 24 | 1 | 1 | −5.9 | −6.7 | −10.1 | −15.7 |
| 25 | 1 | 1 | −5.2 | −6.8 | −11.4 | −22.2 |
| 26 | 1 | 1 | −4.0 | −6.0 | −9.5 | −15.3 |
| 27 | 1 | 1 | −5.3 | −6.7 | −10.9 | −19.3 |
| 28 | 1 | 1 | −5.1 | −7.0 | −11.5 | −18.4 |
| 29 | 1 | 1 | −8.9 | −13.2 | −18.1 | −23.3 |
| 30 | 1 | 1 | −4.8 | −6.0 | −8.7 | −12.0 |
| 31 | 1 | 1 | −4.4 | −5.6 | −8.5 | −14.8 |
| 32 | 2 | 2 | −16.3 | −14.7 | −13.4 | −11.8 |
| 14 | 2 | 2 | −22.0 | −20.6 | −22.6 | −24.5 |

Use Example 34:

The procedure of Use Example 1 is repeated with the further incorporation, to one part of the compound from Use Example 1, of one part of C.I. Solvent Blue 125 (see Comparative Example 1). The following q/m values are measured as a function of the activation period:

| Activation period [min] | Charge q/m [μC/g] |
|---|---|
| 5 | −11.3 |
| 10 | −14.9 |
| 30 | −21.7 |
| 120 | −26.6 |

The high positive intrinsic triboelectric effect of C.I. Solvent Blue 125 (see Example 1) can be reversed markedly in polarity to negative by adding 1 part of a compound from Use Example 1.

Use Example 35:

The procedure of Use Example 1 is repeated with the further incorporation, to one part of the compound from Use Example 1, of 5 parts of carbon black 125 (Mogul L, Cabot, see Comparative Example 2). The following qim values are measured as a function of the activation period:

| Activation period [min] | Charge q/m [μC/g] |
|---|---|
| 5 | −13.0 |
| 10 | −14.6 |
| 30 | −14.9 |
| 120 | −20.0 |
| 24 h | −30.7 |

Use Example 36:

The procedure of Use Example 1 is repeated but using only 0.5 part rather than 1 part of the compound from Use Example 1. The following qim values are measured as a function of the activation period:

| Activation period [min] | Charge q/m [μC/g] |
|---|---|
| 5 | −8.5 |
| 10 | −15.7 |
| 30 | −27.3 |
| 120 | −44.3 |
| 24 h | −63.7 |

Use Example 37:

The procedure of Use Example 1 is repeated but using 2 parts rather than 1 part of the compound from Use Example 1. The following q/m values are measured as a function of the activation period:

| Activation period [min] | Charge q/m [μC/g] |
|---|---|
| 5 | −19.3 |
| 10 | −27.7 |
| 30 | −45.0 |
| 120 | −55.3 |
| 24 h | −75.5 |

Use Example 38:

1 part of the compound from Use Example 1 was incorporated homogeneously into 99 parts of a powder coating binder (®Crylcoat 430) as described for the abovementioned use examples. The triboelectric spraying of the powders (powder coating materials) was carried out with a spraying apparatus such as the ®TriboStar from Intec (Dortmund, Germany), having a standard spraying pipe and a star-shaped interior rod, at maximum powder throughput with a spray pressure of 3 and 5 bar. For this purpose, the article to be sprayed was suspended in a spray booth and sprayed directly from the front from a distance of about 20 cm without further movement of the spraying apparatus. The respective charge of the sprayed powder was subsequently measured with a device from Intec for measuring the triboelectric charge of powders. For the measurement, the measuring antenna of the device was held directly in the cloud of powder emerging from the spraying device. The current strength resulting from the electrostatic charge of powder coating material or powder was indicated in μA. The deposition rate was subsequently determined, in %, by differential weighing of sprayed and deposited powder coating material.

| Pressure [bar] | Current [μA] | Deposition rate [%] |
|---|---|---|
| 3 | 0.3–0.5 | 50 |
| 5 | 1.2–1.7 | 48 |

Use Example 39

The compound from Use Example 1 is treated as in Use Example 1 except that the sample of the subsequent qim measurement is stored not at the usual relative atmospheric humidity (between 35 and 65%) but instead at a relative atmospheric humidity of 10% (25° C.) for 24 h, this humidity being established in a climatically controlled cabinet (from Espec).

The following q/m values are measured here as a function of the activation period:

| Activation period [min] | Charge q/m [μC/g] |
|---|---|
| 5 | −9.5 |
| 10 | −15.0 |
| 30 | −25.3 |
| 120 | −45.4 |

It is evident that the relatively strong negative triboelectric effect of the compound from the Use Example 1 is maintained.

Use Example 40

The procedure of Use Example 39 is repeated, with the sample being stored in the climatically controlled cabinet at a relative atmospheric humidity of 90% (25° C.) for 24 h. The following q/m values are measured here as a function of the activation period

| Activation period [min] | Charge q/m [μC/g] |
|---|---|
| 5 | −9.5 |
| 10 | −10.8 |
| 30 | −13.7 |
| 120 | −19.1 |

Here again, the marked negative triboelectric effect of the compound is maintainted.

Comparative Example 1:

The procedure of Use Example 1 is repeated but in this case 1 part of C.I. Solvent Blue 125 is incorporated instead of 1 part of a compound from Use Example 1. The following q/m values are measured as function of the activation period:

| Activation period [min] | Charge q/m [μC/g] |
|---|---|
| 5 | −0.1 |
| 10 | +0.4 |
| 30 | +2.7 |
| 120 | +10.4 |
| 24 h | +29.3 |

The pronounced positive intrinsic triboelectric effect of the blue colorant is clearly evident.

Comparative Example 2:

The procedure of Use Example 1 is repeated but in this case 5 parts of carbon black (®Mogul L, Cabot) are incorporated instead of 1 part of the compound from Use Example 1. The following q/m values are measured as function of the activation period:

| Activation period [min] | Charge q/m [μC/g] |
|---|---|
| 5 | −14.5 |
| 10 | −15.2 |
| 30 | −14.5 |
| 120 | −7.3 |
| 24 h | +3.4 |

It is evident that the carbon black employed shifts the negative charge in the positive direction to a marked extent.

What is claimed is:

1. A method of controlling and improving the charge in electrophotographic toners and developers, in powder coating materials, in electret materials and in electrostatic separation processes, comprising adding thereto a metal carboxylate or metal sulfonate of the formula (1), (2) or (2a),

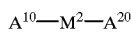 (1)

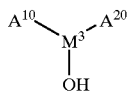 (2)

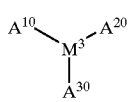 (2a)

in which $A^{10}$ is an acid radical of acid $A^1$ as defined below;

$A^{20}$ is an acid radical of acid $A^2$ as defined below;

$A^{30}$ is as defined for $A^{10}$ or $A^{20}$;

$M^2$ is a divalent metal cation, and $M^3$ is a trivalent metal cation, wherein $A^1$ is a) an acid of fornulae (I) to (VIII)

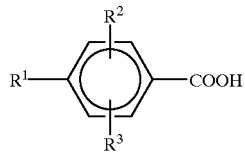 (I)

in which $R^1$ is a linear or branched alkyl radical with 1 to 18 carbon atoms, $R^2$ and $R^3$ are identical or different and are hydrogen, $C_1$–$C_8$-alkyl, ($C_1$–C18)-hydroxyalkylene, nitro, cyano, fluoro, chloro, bromo, $C_1$–$C_4$-acyl, $C_6$–$C_{10}$-aryl, heteroaryl, it being possible for aryl and heteroaryl to be substituted by from 1 to 3 of the radicals carboxyl, hydroxyl, $C_1$–$C_4$-alkoxy, $C_1$–$C_4$-alkyl, $C_1$–$C_4$-acyl, halogen, hydroxy-($C_1$–$C_4$)-alkyl and amino,

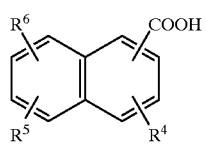 (II)

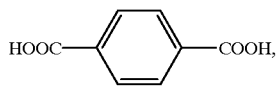

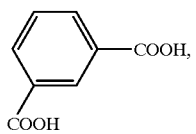

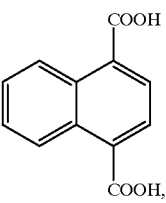

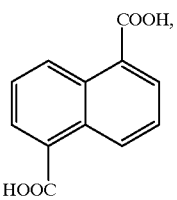 (VI)

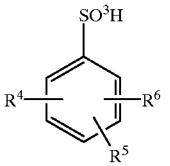 (VII)

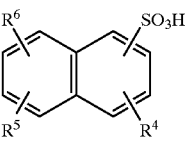 (VIII)

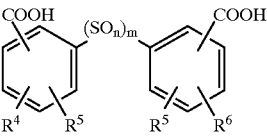

in which $R^4$, $R^5$ and $R^6$ are identical or different and are hydrogen, $C_1$–$C_8$-alkyl, ($C_1$–$C_{18}$)-hydroxyalkylene, nitro, cyano, fluoro, chloro, bromo, $C_1$–$C_4$-acyl, $C_6$–$C_{10}$-aryl, heteroaryl, it being possible for aryl and heteroaryl to be substituted from 1 to 3 of the radicals carboxyl, hydroxyl, $C_1$–$C_4$-alkoxy, $C_1$–$C_4$-alkyl, halogen, hydroxy-($C_1$–$C_4$)-alkyl and amino, m is 1, 2 or 3, and n is 0, 1 or 2;

b) a heteroaromatic mono- or dicarboxylic acid;

c) a polyanion-forming compound selected from the group consisting of poly(styrenesulfonic acid), poly(acrylic acid), poly(methacrylic acid), poly(maleic acid), poly(anetholsulfonic acid), poly(itaconic acid), poly(vinyl sulfate), poly(vinylsulfonic acid), poly(acrylic acid-co-maleic acid), poly(styrenesulfonic acid-co-maleic acid), poly(ethylene-co-acrylic acid), hectorite, bentonite, algic acid, pectic acid, kappa-, lambda-, and iota-carrageenans, xanthan, gum arabic, dextran sulfate, carboxymethyldextran, carboxymethylcellulose, cellulose sulfate, starch sulfate, lignosulfonates, gum karaya; polygalacturonic acid, polyglucuronic acid, polyguluronic acid, polymannuronic acid and copolymers thereof, chondroitin sulfate, heparin, heparan sulfate, hyaluronic acid, dermatan sulfate, keratan sulfate; and derivatives of starch, amylose, amylopectin, cellulose, guaran, gum arabic, gum karaya, guar gum, pullulan, xanthan, dextan, curdlan, gellan, carubin, agarose, chitin, and chitosan having the following functional groups:

carboxymethyl, carboxyethyl, carboxypropyl, 2-carboxyvinyl, 2-hydroxy-3-carboxypropyl, 1,3dicarboxyisopropyl, sulfomethyl, 2-sulfoethyl, 3-sulfopropyl, 4-sulfobutyl, 5-sulfopentyl, 2-hydroxy-3-sulfopropyl, 2,2-disulfoethyl, 2-carboxy-2-sulfoethyl, maleate, succinate, phthalate, glutarate, aromatic and aliphatic dicarboxylates, xanthogenate, sulfate, phosphate, 2,3-dicarboxy, N,N-di(phosphatomethyl) aminoethyl, N-alkyl-N-phosphatomethyl-aminoethyl, it also being possible for these to contain methyl, ethyl, propyl, isopropyl, 2-hydroxyethyl, 2-hydroxypropyl and 2-hydroxybutyl groups and also esters with aliphatic carboxylic acids ($C_2$ to $C_{18}$);

and of the formula (X)

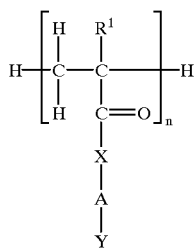

(X)

where n=5 to $5 \times 10^5$; and $R^1$, X, A and Y are each identical or different and defined as follows:

$R^1$=H or $CH_3$;

X=O or NH;

A=branched or linear ($C_1$–$C_{18}$)alkylenes or arylenes;

Y=$SO_3$, COO, $N^pR^3_2$—A—COO, $N^pR_2$—A—$SO_3^\circ$, $N^{(2}R^3_2$—A—PO(OH)$O^\circ$ where $R^3$=$C_1$–$C_8$)-alkyl;

and also copolymers consisting of monomers of the above-mentioned compounds and one or more of the following monomers: acrylic acid, methacrylic acid, acrylic acid alkyl-($C_1$–$C_{18}$)-ester, methacrylic acid alkyl($C_1$–$C_{18}$) ester, glycidyl methacrylate, acrylamide, acrylonitrile, methacrylonitrile, ethylene, styrene, α-methylstyrene, styrenesulfonic acid, butadiene, butene, isoprene, vinyl chloride, propylene, maleic anhydride, maleic acid, maleic acid monoalkyl($C_1$–$C_{18}$) or dialkyl-($C_1$–$C_{18}$) ester, alkyl-($C_1$–$C_{18}$) vinyl ether, vinyl alcohol, vinyl acetate, vinylbutyral, vinylimidazole, N-vinyl-2-caprolactam, N-vinylpyrrolidone, mono- or dialkylated ($C_1$–$C_{30}$) N-vinylpyrrolidone, vinylsulfonic acid, diallydimethylammonium chloride, vinylidene chloride, poly(ethylene glycol) methacrylate, poly(ethylene glycol) acrylate;

d) a carboxyl- and/or sulfo-containing polyester, $A^2$ is an acid of formulae (I) to (VIII);

an acid of formula (IX)

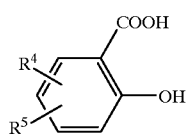

(IX)

in which $R^4$ and $R^5$ are as defined above;

or a heteroaromatic mono- or dicarboxylic acid;

or by reacting an acid $A^1$ as defined in c) or d) with an acid $A^2$ in the definition of the formulae (I) to (IX) in which $R^1$ to $R^6$ have the definitions specified above and in addition the definition ($C_1$–$C_{18}$)-alkoxy, hydroxyl, amino, ($C_1$–$C_{18}$) alkylamino, di($C_1$–$C_{18}$)alkylamino, ($C_1$–$C_{18}$)alkylene-$NR^7R^8$, in which $R^7$ and $R^3$ are hydrogen or $C_1$–$C_8$-alkyl; and the cation of the metal is divalent or trivalent.

2. The method as claimed in claim 1, wherein $M^{2+}$ is $Fe^{2+}$, $Zn^{2+}$, $Co^{2+}$, $Ni^{2+}$, $Mn^{2+}$, $Cu^{2+}$, $Mg^{2+}$, $Ca^{2+}$, $Sr^{2+}$ or $Ba^{2+}$.

3. The method as claimed in claim 1, wherein $M^{3+}$ is $A^{13+}$, $Fe^{3+}$, $Mn^{3+}$, or $Co^{3+}$.

4. The method as claimed in claim 1, wherein $A^1$ is a compound of the formula a)

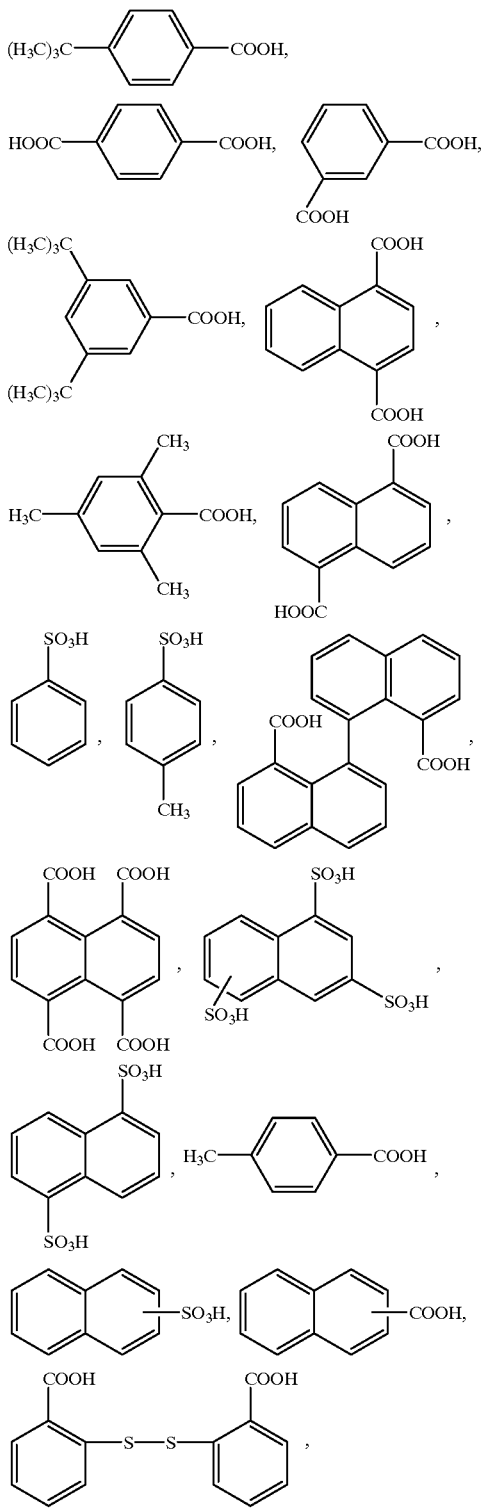

-continued b)

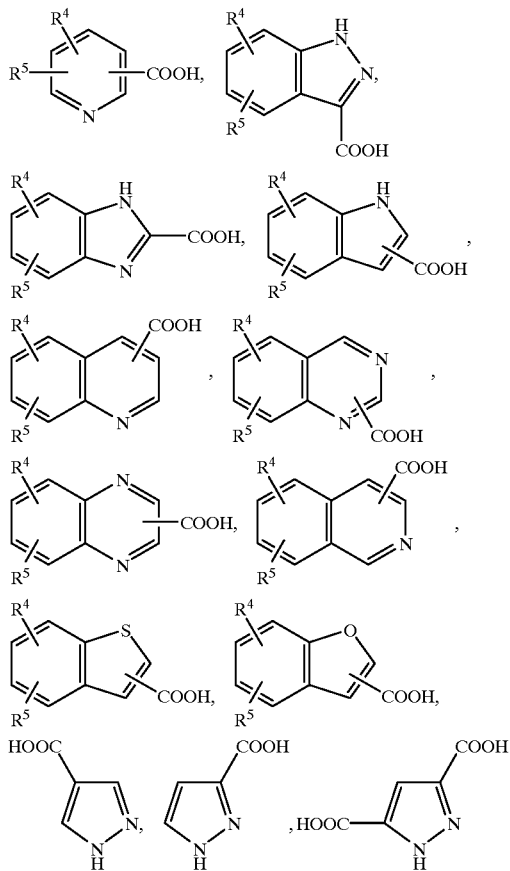

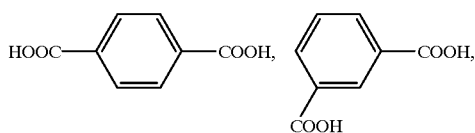

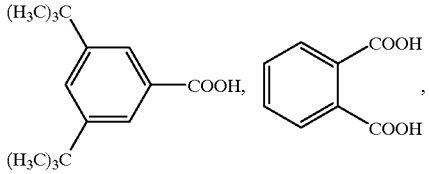

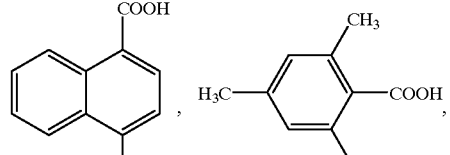

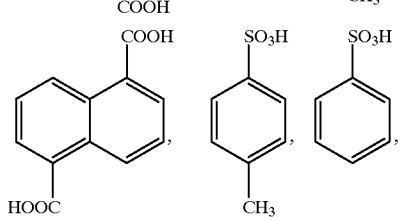

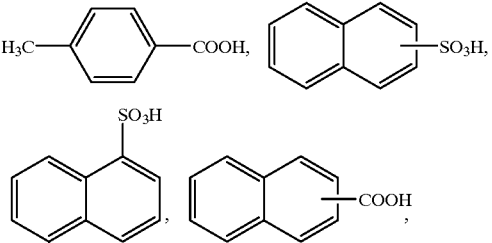

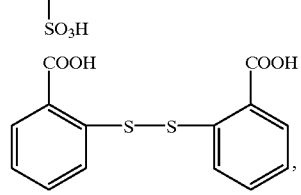

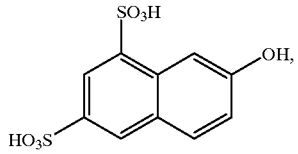

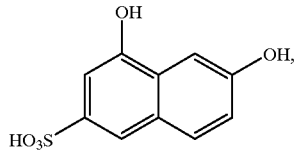

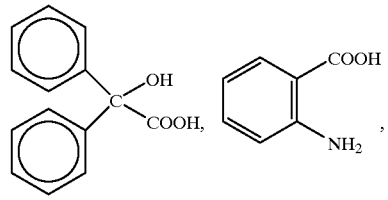

c) poly(methacrylic acid), poly(styrenesulfonic acid), poly(ethylenesulfonic acid), poly(styrenesulfonic acid-co-maleic acid 1:1), d) polyester consisting of the reaction product of the individual components i), ii) and iii) and optionally, iv) and, optionally, v), where
   i) is a dicarboxylic acid or a reactive derivative of a dicarboxylic acid which is free from sulfo groups,
   ii) is a difunctional aromatic, aliphatic or cycloaliphatic sulfo compound whose functional groups are hydroxyl or carboxyl, or hydroxyl and carboxyl,
   iii) is an aliphatic, cycloaliphatic or aromatic diol, a polyether diol or a polycarbonate diol,
   iv) is a polyfunctional compound (functionality >2), whose functional groups are hydroxyl or carboxyl, or hydroxyl and carboxyl, and
   v) is a monocarboxylic acid or a sulfo-containing monoalcohol.

5. The method as claimed in claim 1, wherein $A^2$ is a compound of the formula

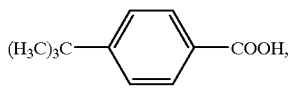

-continued

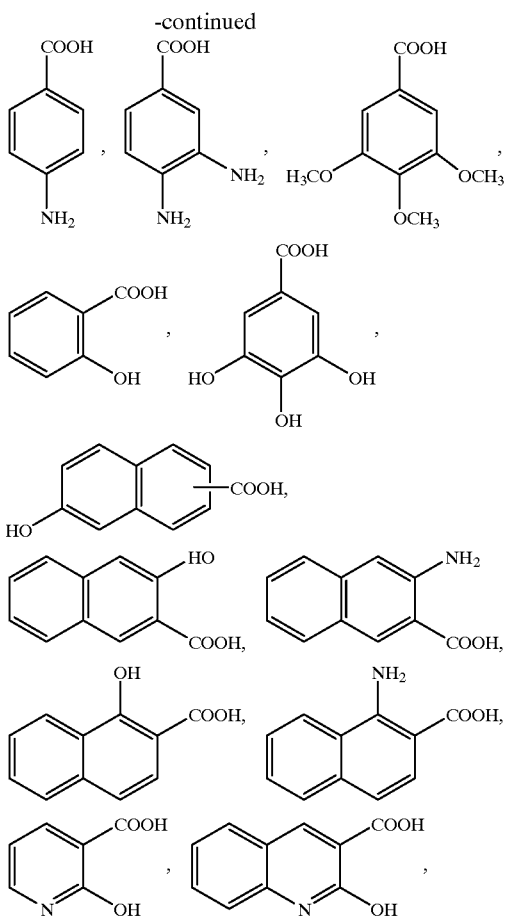

6. The method as claimed in claim 1, wherein the metal carboxylate or metal sulfonate is a compound of the formula (1) or (2a) in which
- $A^{10}$ is 4-tert-butylbenzoate, poly(ethylenesulfonate), poly(methacrylate), diphenyl disulfide 2,2'-dicarboxylate or poly(styrenesulfonate);
- $A^{20}$ is 4-tert-butylbenzoate, diphenyl disulfide 2,2'-dicarboxylate or salicylate;
- $M^{2+}$ is $Zn^{2+}$ and $M^{3+}$ is $Al^{3+}$.

7. The method as claimed in claim 1, wherein the metal carboxylate or metal sulfonate is employed in combination with a further charge control agent selected from the group consisting of triphenylmethanes, ammonium and immonium compounds, iminium compounds, fluorinated ammonium and fluorinated immonium compounds; biscationic acid amides; polymeric ammonium compounds; diallylammonium compounds; aryl sulfide derivatives, phenol derivatives; phosphonium compounds and fluorinated phosphonium compounds; calix(n)arenes, cyclically linked oligosaccharides, interpolyelectrolyte complexes, polyester salts; benzimidazolones; azines, thiazines or oxazines, or metal azo complex dyes.

8. The method as claimed in claim 1, wherein the overall concentration of metal carboxylate and metal sulfonate and further charge control agents if added is from 0.01 to 50% by weight, based on the overall mixture of the electrophotographic toner, developer, power coating material or electret material.

9. The method as claimed in claim 1, wherein the overall concentration of metal carboxylate and metal sulfonate and further charge control agents if added is from 0.1 to 5% by weight, based on the overall mixture of the electrophotographic toner, developer, power coating material or electret material.

10. An electrophotographic toner comprising a metal carboxylate or metal sulfonate as set forth in claim 1 and, optionally, one or more positive or negative charge control agents in an overall concentration of from 0.01 to 50% by weight, based on the overall weight of the toner, and a customary toner binder.

11. The electrophotographic toner as claimed in claim 10, additionally comprising from 1 to 10% by weight of colorant, based on the overall weight of the electrophotographic toner.

12. A powder coating material comprising a metal carboxylate or metal sulfonate as set forth in claim 1 and, optionally, one or more positive or negative charge control agents in an overall concentration of from 0.01 to 50% by weight, based on the overall weight of the powder coating material, and a customary powder coating binder.

13. The powder coating material as claimed in claim 12, further comprising from 1 to 10% by weight of colorant, based on the overall weight of the powder coating material.

* * * * *